United States Patent
Girondi

(10) Patent No.: US 8,617,391 B2
(45) Date of Patent: Dec. 31, 2013

(54) FILTER COMPONENT

(75) Inventor: Giorgio Girondi, Mantova (IT)

(73) Assignee: UFI Filters S.p.A., Porto Mantovano (Mantova) (IT)

( * ) Notice: Subject to any disclaimer, the term of this patent is extended or adjusted under 35 U.S.C. 154(b) by 0 days.

(21) Appl. No.: 13/992,110

(22) PCT Filed: Jan. 26, 2012

(86) PCT No.: PCT/IB2012/000126
§ 371 (c)(1),
(2), (4) Date: Jun. 6, 2013

(87) PCT Pub. No.: WO2012/104699
PCT Pub. Date: Aug. 9, 2012

(65) Prior Publication Data
US 2013/0292324 A1 Nov. 7, 2013

(30) Foreign Application Priority Data
Feb. 4, 2011 (IT) .............................. RE2011A0004

(51) Int. Cl.
*B01D 27/00* (2006.01)
*B01D 29/00* (2006.01)
*B01D 35/00* (2006.01)
*B01D 36/02* (2006.01)
*B01D 35/28* (2006.01)
*F02M 37/22* (2006.01)

(52) U.S. Cl.
USPC ........... 210/259; 210/248; 210/260; 210/261; 210/262; 210/323.1; 210/314; 210/316; 210/416.4; 210/435; 210/437; 210/440; 210/443; 210/450

(58) Field of Classification Search
None
See application file for complete search history.

(56) References Cited

U.S. PATENT DOCUMENTS

| | | | | |
|---|---|---|---|---|
| 3,256,988 A * | 6/1966 | Lanier et al. | ................... | 210/130 |
| 3,312,351 A * | 4/1967 | Kasten | ........................... | 210/307 |
| 3,879,292 A | 4/1975 | McClive | | |
| 6,881,328 B2 * | 4/2005 | Dittmann et al. | ............... | 210/86 |
| 6,926,827 B2 * | 8/2005 | Gruca et al. | ................... | 210/234 |
| 7,731,845 B2 * | 6/2010 | Lampert et al. | ............... | 210/232 |
| 2006/0006109 A1 * | 1/2006 | Klein et al. | .................... | 210/299 |
| 2006/0163146 A1 * | 7/2006 | Girondi | ......................... | 210/440 |
| 2008/0190839 A1 * | 8/2008 | Girondi | ...................... | 210/433.1 |
| 2010/0132657 A1 | 6/2010 | Kiedaisch et al. | | |

FOREIGN PATENT DOCUMENTS

| | | |
|---|---|---|
| DE | 202007007120 U1 | 10/2008 |
| EP | 1574796 A2 | 9/2005 |
| GB | 741918 A | 12/1953 |
| JP | 2004305921 A | 11/2004 |
| WO | 2008046707 A1 | 4/2008 |

* cited by examiner

*Primary Examiner* — Benjamin Kurtz
(74) *Attorney, Agent, or Firm* — Browdy and Neimark, PLLC

(57) ABSTRACT

A component (5) for filters (10) comprising a plate (50) provided with at least a through-opening (54) in a thickness thereof and a perimeter edge to which a seal (51) is fixed, which seal (51) is destined to be interposed between a beaker-shaped body (21) and a cover (22) of a casing (20) of a filter (10), and a flat filter wall (55) fixed to the plate (50) in such a way as to intercept the at least a through-opening (54) and a hollow shank (53) suitable for accommodating the end of a pipe (56) for removal of the water accumulated on the bottom of the beaker body (21).

8 Claims, 3 Drawing Sheets

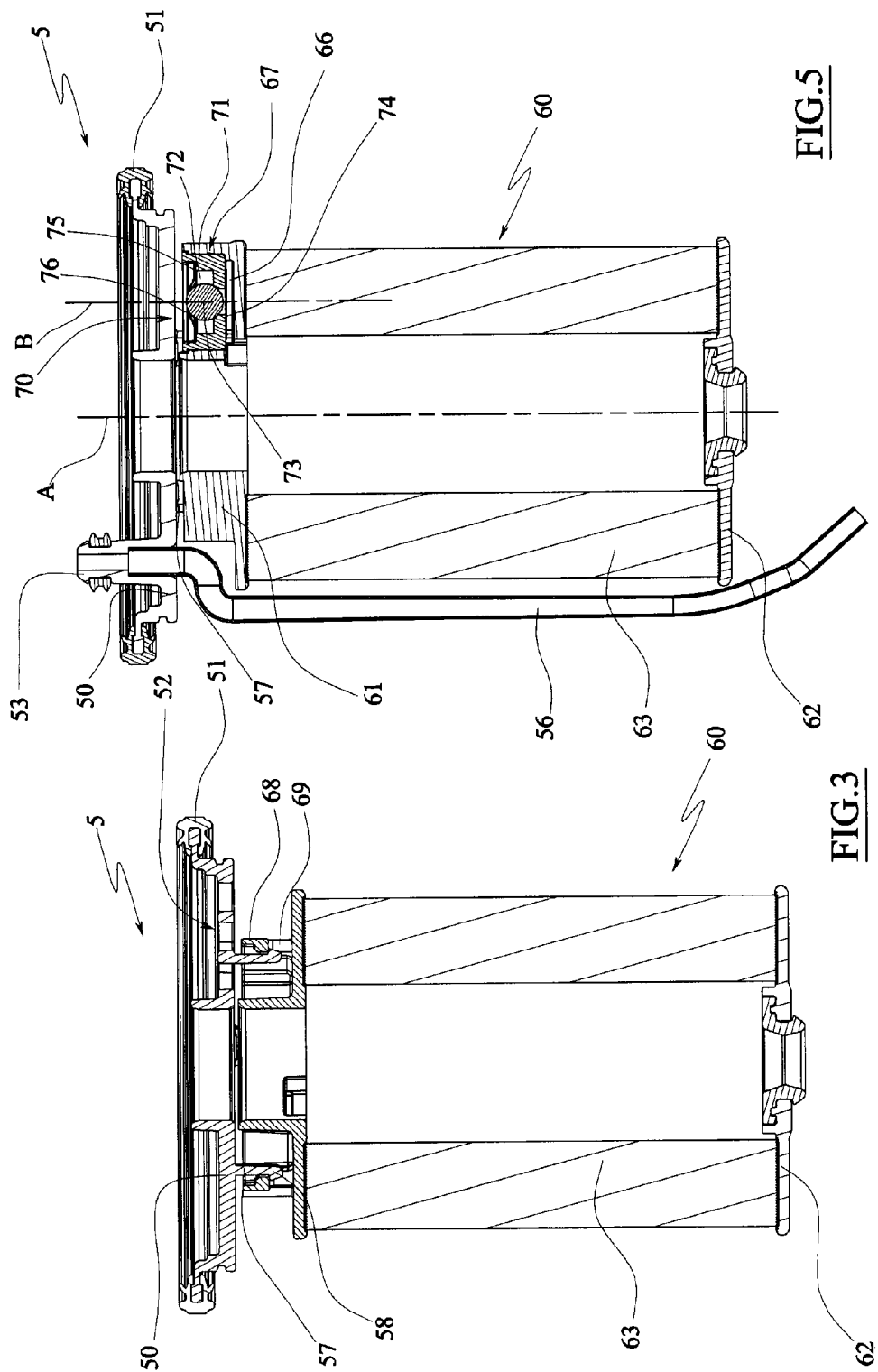

FILTER COMPONENT

TECHNICAL FIELD

The present invention relates to a component for a filter and, more in particular, to a component of a filter for fuel or lubricating oil in motoring applications, for example for motor cars, lorries, commercial vehicles and work machines, or in hydraulic applications.

BACKGROUND

As is known, a filter comprises an external casing, generally formed by a beaker-shaped body and a relative closing cover, which is provided with an inlet conduit for a fluid to filter and an outlet conduit for the filtered fluid, and a filter cartridge designed to sub-divide the internal volume of the casing into at least two distinct chambers, of which a first chamber communicating with the inlet conduit and a second chamber communicating with the outlet conduit. A typical filter cartridge comprises a support plate to which is fixed an end of a tubular filter wall, for example a pleated filter wall having a star-shaped geometry or a depth wall, the other end of which is fixed to a second support plate.

One of the support plates is destined to close the internal cavity of the filter wall, while the opposite plate exhibits, in general terms, an opening destined to place the internal cavity in communication with the inlet conduit or alternatively the outlet conduit of the filter.

Further, one of the support plates can sometimes be conformed such as to house a perimeter seal, which is destined to be interposed between the closing cover and the beaker-shaped body of the filter casing such as to hermetically close it.

It is further possible for the cartridge to exhibit a secondary filter wall located downstream of the first filter wall with reference to the flow direction of the fuel from the inlet conduit to the outlet conduit.

Generally the secondary filter wall is also a star-shaped pleated filter wall or a depth wall which is coaxially associated to the first filter wall.

The second filter wall generally exhibits a larger porosity than the first filter wall, as in normal use it is mainly tasked with separating the water which can be present in the filtered fluid by coalescence.

The water which separates from the filtered fluid generally collects on the bottom of the external casing of the filter, where special discharge means are present.

The filters of known type can further comprise a by-pass conduit, provided with a respective valve, which is destined to by-pass the first filter wall when it is clogged.

In this way, a certain quantity of fluid is guaranteed to exit from the filter and it is also sure to be without the larger-dimension impurities as it will pass through the secondary filter wall.

Various consumer components are present in the filter, among which, in particular, components subject to wear, such as the above-mentioned seal, and components subject to progressive clogging, such as the filter walls.

The consumer components consequently require periodical maintenance interventions for substitution thereof, as they progressively become worn or blocked up.

In an attempt to reduce the number of maintenance interventions, the secondary filter wall has been so dimensioned as to make its working life of the same length as the whole filter, i.e. so that the secondary filter wall does not by itself require replacing during the life of the whole filter.

However, in order to achieve this, it is necessary to make the secondary filter wall such that it exhibits a passage surface which is sufficient not to clog over its working life.

Therefore, the secondary filter wall exhibits considerable spatial dimensions internally of the filter casing, and leads to the need to design casings having a conformation and design which are appropriate for the presence of the secondary filter wall.

A further drawback of known filters is having to predispose discharge means of the water on the bottom of the external casing of the filter. This location leads to a greater constructional complication of the beaker body which defines the bottom of the external casing, and further leads to some limitations regarding the installation of the filter. The filter has always to be installed in a sufficiently large space not only for enabling connection of the inlet and outlet conduits of the fluid to be filtered, which are positioned at the upper cover, but also for guaranteeing accessibility of the water discharge means, which are at the bottom of the beaker body.

SUMMARY

In the light of the above, an aim of the present invention is to reduce the number of maintenance interventions needed for replacement of consumer components, while at the same time enabling the size of the secondary filter wall to be limited, and with it containing the size of the filter casing.

A further aim is to simplify the construction of the external casing, while guaranteeing the complete efficiency and functionality of the filter.

A further aim of the present invention is to attain the above-mentioned is objectives with a solution that is simple, rational and relatively inexpensive. These aims are attained by the characteristics of the invention reported in the independent claim. The dependent claims delineate preferred and/or particularly advantageous aspects of the invention.

In particular, the invention provides a component for filters comprising a plate provided with at least a through-opening passing through the thickness thereof and a perimeter edge to which a seal is fixed which is destined to be interposed between a beaker-shaped body and a cover of a filter casing, characterised in that it comprises at least a flat filter wall fixed to the plate in such a way as to intercept the at least an opening, and a hollow shank suitable for accommodating the end of a pipe for removal of the water accumulated on the bottom of the beaker body.

Thanks to this solution, the replacement of the plate enables contemporary replacement, with a single maintenance intervention, of both the seal destined to hermetically close the filter and the flat secondary filter wall, thus reducing the number of interventions required to replace the elements and enabling at the same time a secondary filter wall to be realised that has contained dimensions.

The component of the invention further has the advantage of enabling discharge of the water through the top part of the filter, where there are generally the inlet and outlet conduits of the fluid to be filtered, thus rendering the discharge means that are normally predisposed on the bottom of the beaker body superfluous, with consequent benefits in terms of constructional simplicity and freedom of installation of the filter.

Further, the pipe for discharge of the water can be advantageously replaced together with the plate, each time guaranteeing the return to complete efficiency of the water discharge system which, if not thus reset, might to progressively worsen following eventual formation of solid deposits internally of the pipe.

The component of the invention further has the advantage of being associable to many types of filter, among which some filters the casings of which were not initially designed to receive a plurality of filter walls.

In a preferred aspect of the invention, the flat filter wall is a hydrophobic wall. In this way, the filter wall not only enables a filtering of the solid fraction present in the fuel but also enables separation of the water contained in the fuel.

In a further preferred aspect of the invention the plate has a disc shape. Further, the flat filter wall also exhibits a substantially disc shape with an external diameter which is not greater than the diameter of the plate. This solution makes possible realisation of a plate having a decidedly compact filter part.

In an advantageous aspect of the invention the seal is co-formed with the plate, such as to optimise the productive process of the whole component. However, as an alternative the seal can be removably associated to the plate.

A preferred embodiment of the invention further provides a filter group which comprises a filter cartridge and a component as described herein above, in which for example the filter cartridge comprises a main filter wall that is substantially tubular and a support plate fixed to an end of the main filter wall. The application of a plate provided with the flat filter wall together with a filter cartridge enables realisation of a filter group made up of two filter walls having a small spatial size, and also being easy to replace and versatile in use.

The flat filter wall advantageously lies on a substantially perpendicular plane to the axis of the main filter wall and is superposed thereto.

This detail enables a filter group of decidedly contained dimensions to be realised, which at the same time provides a high degree of filtering efficiency, even in clogged conditions of the main filter wall.

Further, thanks to this detail the invention enables easy adaptability and compatibility of the plate and the relative filter cartridge to filters of known type, for example filters already on the market, even after the production and marketing thereof, without its being necessary to make any structural adaptation.

In an aspect of the invention the plate comprises engaging means of the filter cartridge to the support plate.

In this way, the plate equipping the seal and the flat filter wall can easily be associated to different types of filter cartridges, thus at the same time facilitating the operations of realisation and mounting of the plate.

In a further embodiment, it is possible to replace the above-described engaging means between the plate and the filter cartridge with a plate made in a single piece with the support plate of the filter cartridge.

Thanks to this solution the contemporary replacement of all the components subject to wear is guaranteed, i.e. the main filter wall, the secondary filter wall and the seal, all in a single maintenance intervention.

In a further embodiment of the invention, the filter group comprises a by-pass conduit destined to set an internal volume of the main filter wall in communication with an outside of the main filter wall, which by-pass conduit is intercepted by a valve.

The conduit and the valve are advantageously associated to the filter conduit. This solution enables the fluid to be filtered to be in any case at least roughly filtered and/or in any case to be separated from the water even when the main filter wall is clogged.

A still further embodiment of the invention provides a filter which comprises a casing containing a filter group as described above.

This solution enables a filter to be realised in which, during replacement of one from among the main filter wall, the second filter wall or the seal, performed during normal maintenance thereof, it is not possible to forget or fail to replace all of the other parts of the filter that are subject to consumption (wear or deterioration in performance).

Further, this particular enables a filter to be obtained which has two filter walls in series, exhibiting overall dimensions which are small while at the same time enabling simple and rapid regeneration during the maintenance operations of the filter itself.

BRIEF DESCRIPTION OF DRAWINGS

Further characteristics and advantages of the invention will emerge from a reading of the following description, provided by way of non-limiting example, with the aid of the figures illustrated in the accompanying drawings.

FIG. 3 is section III-III of FIG. 2;

FIG. 5 is section V-V of FIG. 2.

DETAILED DESCRIPTION

Figure 1:
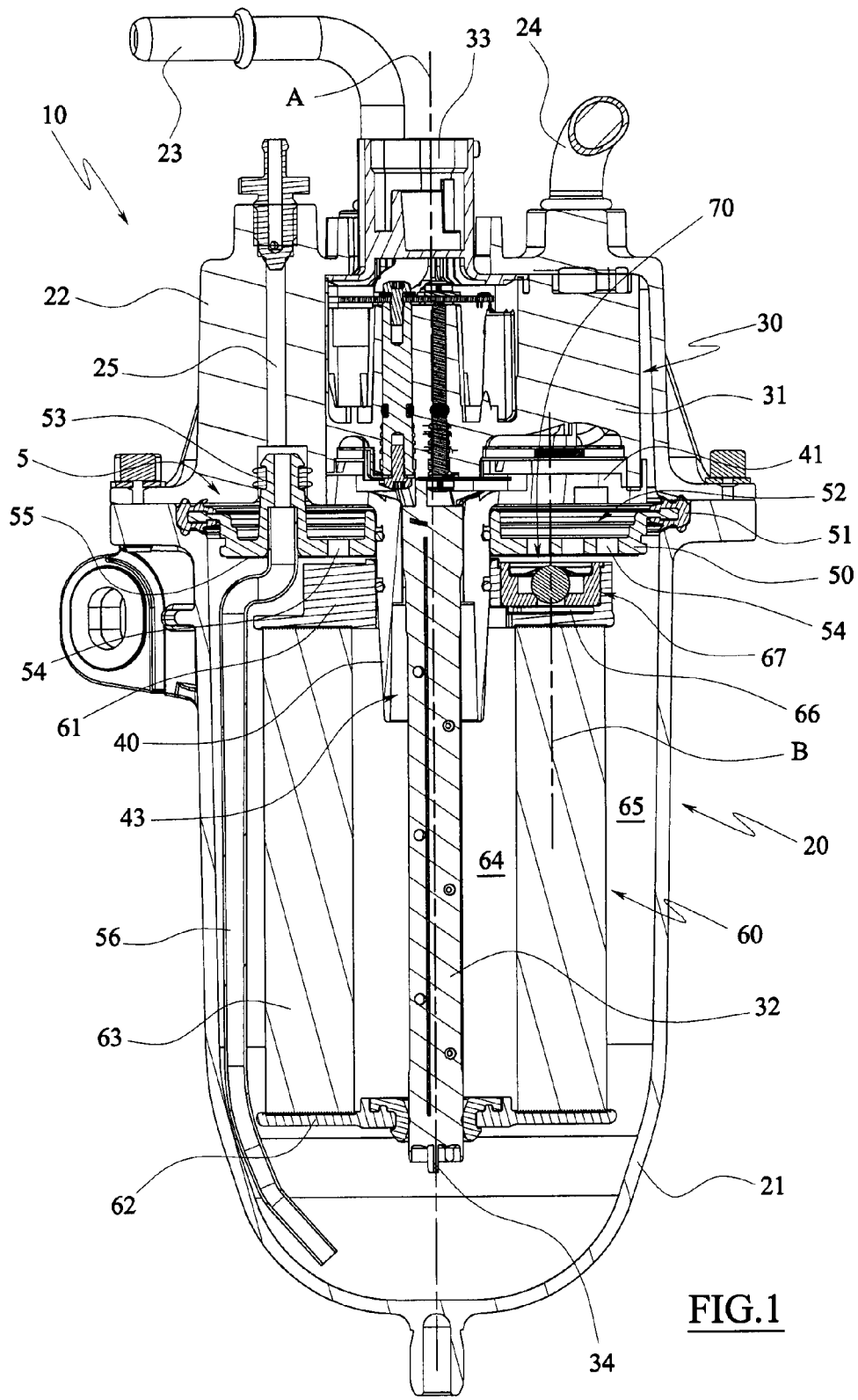
FIG. 1 is a longitudinal section of a filter according to an embodiment of the present invention.
Figure 4:
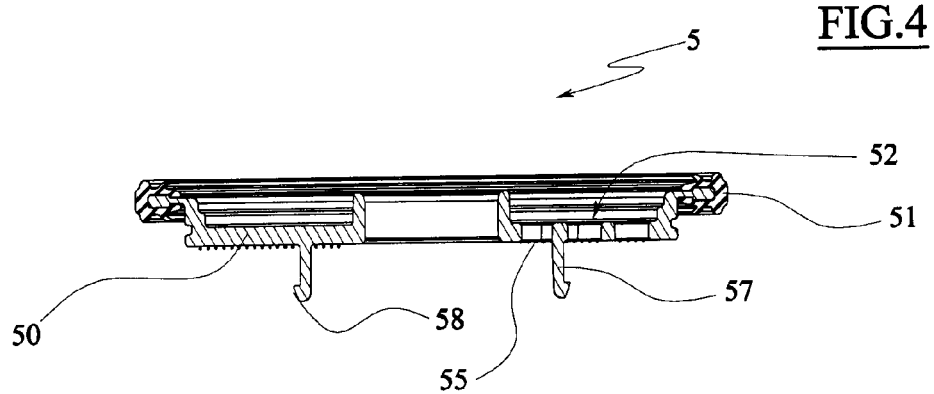
FIG. 4 is an enlarged detail of FIG. 3, relating to a component of the filter group according to an embodiment of the present invention.
Figure 2:
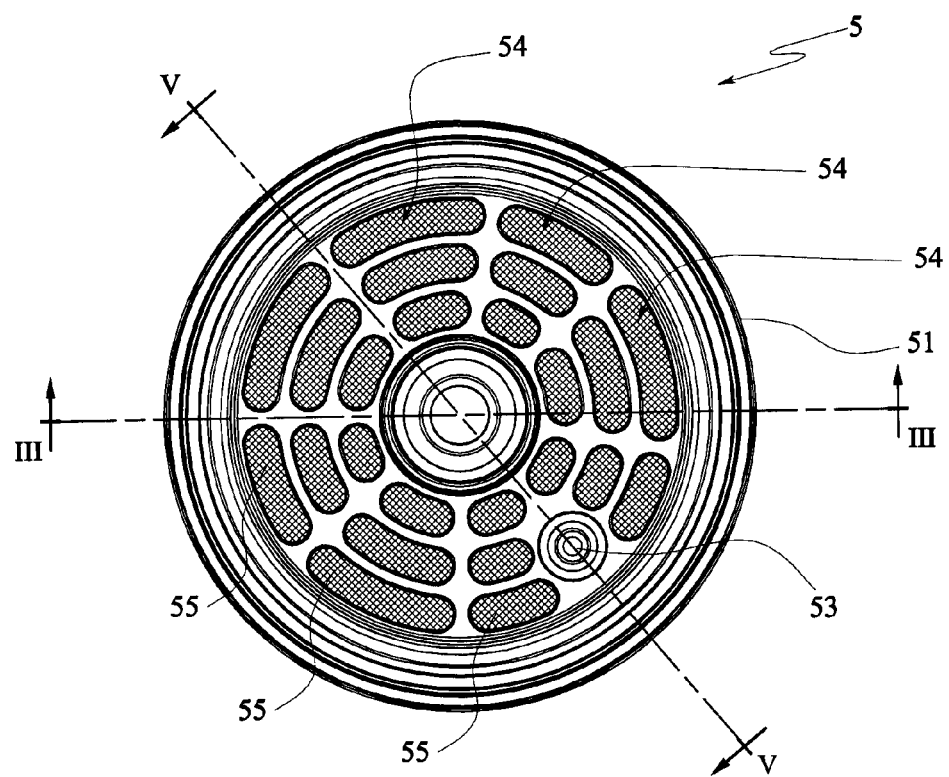
FIG. 2 is a view from above of a filter group according to an embodiment of the present invention.

The filter 10 illustrated in FIG. 1 is a filter for diesel fuel destined to be applied to diesel engines, in particular diesel engines for motor cars, lorries, commercial vehicles or self-propelling work machines.

The filter 10 comprises an external casing, denoted in its entirety by 20, which is formed by a beaker-shaped body 21 and an upper cover 22 destined to close the casing 20.

The cover 22 comprises an inlet conduit 23 for the diesel to be filtered, an outlet conduit 24 for the filtered diesel and a discharge conduit 25 for the water which can accumulate on the bottom of the beaker-shaped body 21.

A monolithic component 30 is housed internally of the casing 20, which component 30 comprises a broadened upper portion 31 which is housed in a corresponding seating afforded in the cover 22, and a lower stem portion 32 to which is welded to the broadened portion 31 and develops axially downwards internally and centrally of the beaker-shaped body 21.

A sleeve 40 is coaxially inserted on the stem portion 32, the upper end of which exhibits a substantially flat flange 41 which is sealedly welded on the broadened portion 31 of the monolithic portion 30.

The sleeve 40 is dimensioned such as to define, with the stem portion 32, a hollow space 43, which is slightly tapered in an upwards direction and is in communication with the inlet conduit 23 of the diesel to be filtered through a connecting channel (not visible) which is afforded in the broadened portion 31 of the monolithic component 30.

The broadened portion 31 incorporates an electric heater (not visible) destined to heat the diesel which flows into the connecting channel, which is electrically supplied by means of an electric socket 33 which projects from the cover 22.

A component, denoted in its entirety by reference numeral 5, provided with a disc-shaped plate 50, is inserted coaxially on the sleeve 40, with an interposing of a seal ring. The plate 50 comprises a central hole for coupling with the sleeve 40 and a perimeter edge that is slightly raised and to which an annular seal 51 is tightly coupled.

The annular seal 51 is housed and compressed internally of a seating which is defined between the cover 22 and the beaker body 21, such as to guarantee hermetic closure of the external casing 20 of the filter 10.

The plate 50 further comprises a hollow spur 53 which inserts, with an interposing of a seal ring, into a special broadening of the discharge conduit 25.

A narrow chamber 52 is defined between the plate 50 and the overlying flange 41, which chamber 52 communicates with the outlet conduit 24 of the filtered diesel via a connecting channel (not visible) afforded partly in the flange 41 and partly in the broadened portion 31 of the monolithic component 30.

A filter cartridge, denoted in its entirety by 60, is further housed internally of the casing 20, which filter cartridge 60 comprises an upper support plate 61 and a lower support plate 62, which are fixed to opposite ends of a tubular filter wall 63, in the present example a polymer depth wall defining and delimiting a substantially-cylindrical internal volume 64.

Both the upper support plate 61 and the lower support plate 62 exhibit a respective central hole, which holes are aligned to one another and centred on the longitudinal axis A of the filter wall 63.

The central hole of the upper support plate 61 is inserted on the sleeve 40, with an interposing of a seal ring, such that the stem portion 32 of the monolithic component 30 axially crosses the whole internal volume 64 of the filter cartridge 60 up to inserting, with an interposing of a further seal ring, into the central hole of the lower support plate 62.

The free end of the stem portion 32 projects beyond the lower support plate 62, where it bears a level sensor 34 destined to detect a level of the water which accumulates on the bottom of the beaker-shaped body 21 during filtration of the fuel.

The level sensor 34 is associated to electric connecting means which are incorporated in the monolithic component 30 and which reach the electric socket 33 by which the level sensor 34 is connected to an electronic control panel (not illustrated) of the vehicle.

In the embodiment illustrated in figures, the upper support plate 61 of the filter cartridge 60 comprises an upper spur 68 destined to be engaged by engaging means of the plate 50.

The engaging means comprise an annular portion inferiorly projecting from the plate.

The annular portion 57 and the upper spur 68 respectively comprise elastically-yielding reliefs 58 and corresponding recesses 69 which give rise to a radially-coupling snap-fit constraint such as to removably constrain together the plate 50 and the upper support plate 61.

In a further embodiment, not illustrated in the figures, the plate 50 can be realised in a single piece with the upper support plate 61.

Thanks to the above-described configuration, the filter cartridge 60 subdivides the internal volume of the beaker-shaped body 21 into a first chamber, coinciding with the internal volume 64 of the main filter wall 63, which communicates with the inlet conduit 23 of the diesel to be filtered, and a second chamber 65, defined externally of the main filter wall 63, which communicates with the outlet conduit 24 via a plurality of through-holes 54 which are fashioned in the plate 50 and which open into the overlying chamber 52.

A shaped tube 56 is located in the second chamber 65, which shaped tube 56 exhibits a first end coupled to the hollow spur 53 of the plate 50 and a second end located at the bottom of the beaker-shaped body 21.

In an aspect of the invention, all the through-openings 54 of the plate 50 are intercepted by a flat secondary filter wall 55, which is fixed to the lower surface of the plate 50 where it lies in a perpendicular plane to the axis A of the main filter wall 63.

Alternatively, the flat second wall 55 might be fixed to the upper surface of the plate 50.

The flat filter wall 55 is preferably a hydrophobic wall, which exhibits a substantially disc shape having an external diameter which is not greater than the diameter of the plate 50.

Further, the flat filter wall 55 generally possesses a greater porosity than the main filter wall 63 of the filter cartridge 60.

In the illustrated example, the flat filter wall 55 is a polymer net having a porosity comprised between 100 and 200 µm, preferably 150 µm; while the filter wall 63 has a porosity of lower than 20 µm in a case in which it is pleated, or has at least a layer having a porosity of lower than 20 µm in a case in which it is a depth filter.

As illustrated in FIGS. 1 and 5, a by-pass conduit 66 is afforded in the upper support plate 61 of the filter cartridge 60, which conduit 66 is destined to set the internal volume 64 of the filter wall 63 directly in communication with the outside, i.e. with the second chamber 65 in this case.

This conduit 66 opens in the centre of a cylindrical seating 67 which is afforded on the external side of the upper support plate 61, in an out-of-centre position with respect to the longitudinal axis A of the filter wall 63, substantially aligned with the lateral wall thereof.

In other words, the cylindrical seating 67 exhibits a longitudinal axis B which is parallel to and dealigned with respect to the longitudinal axis A of the filter wall 63, and which longitudinally crosses the thickness of the wall thereof. The cylindrical seating 67 sealedly houses an automatic valve, denoted in its entirety by 70, which is destined to intercept the conduit 66 in such a way as to regulate the opening and closing thereof.

In detail the automatic valve 70 comprises a hollow valve body 71, conformed substantially as a cylindrical beaker, which is coaxially inserted internally of the cylindrical seating 67 by means of a removable joint coupling. A central through-opening 72 is afforded on the bottom of the valve body 71, which is destined to place the conduit 66 in communication with the internal cavity of the valve body 71.

A sphere 73 is housed in the internal cavity of the valve body 71, which is destined to rest on a countersunk edge 74 of the hole 72, such as to close the conduit 66.

In particular, the sphere 73 is maintained pressed against the countersunk edge 74 by an elastic element 75, which is constrained to the mouth of the valve body 71.

As illustrated in FIG. 5, this elastic element 75 is defined by a slim metal ring arranged coaxially to the valve body 71, which elastic element 75 exhibits a series of radial plates 76 which project towards the centre of the ring, such that free ends of the plates 76 rest on the sphere 73 and press it towards the hole 72.

The radial plates 76 are angularly equidistanced from one another, such as to leave a same number of passage spaces which enable the mouth of the valve body 71 to be kept constantly open, and are elastically flexible such as to enable the sphere 73 to perform small displacements upwards and thus open the hole 72.

In the light of the above description, the functioning of the filter 10 is as follows The diesel to be filtered enters from the inlet conduit 23 and, through the connecting channel (not illustrated), afforded in the monolithic component 30 and the space 43, flows into the internal volume 64 of the filter wall 63. During this passage, the diesel can be heated by the heater which is incorporated in the broadened portion 31 of the monolithic component 30.

The diesel is forced to flow radially from the internal volume 64 through the filter wall 63, from inside towards outside, and thence into the second chamber 65.

In this way the filter wall 64 retains the impurities which can be present in the diesel fuel.

The diesel flows from the second chamber 65 across the flat filter wall 55 which, as it has a greater porosity than the filter wall 63, has mainly the function of separating, by coalescence, the water which can still be contained in the diesel.

The water, thus separated, collects on the bottom of the beaker-shaped body 21 and, when the level of the water reaches the sensor 34, the sensor 34 sends a signal to the control panel of the vehicle, following which the accumulated water is made to exit from the filter 10 through the shaped tube 56 and the discharge conduit 25.

After having crossed the flat filter wall 55, the diesel finally reaches the outlet conduit 24.

Should the pressure of diesel in the internal volume 64 grow to exceed a determined threshold limit, for example following clogging of the filter wall 63 or an excessive viscosity of the diesel at low temperatures, this pressure causes a raising of the sphere 73 of the automatic valve 70 in opposition to the radial plates 76, and thus the opening of the conduit 66 which empties into the second chamber 65.

In this way, the non-filtered diesel flows directly into the second chamber 65 without crossing the filter wall 63, and thus guarantees that there is always a certain outflow of diesel from the outlet conduit 24.

In this case too, all the diesel is forced to cross the flat filter wall 55 which not only performs the above-mentioned function of separating the water, but also subjects the diesel to a rough filtering which at least removes the larger-dimension impurities.

Obviously a technical expert in the second might make numerous modifications of a technical-applicational nature to the above-described filter 10 without its forsaking the ambit of the invention as described in the is following claims.

The invention claimed is:

1. A filter group comprising;
   a filter cartridge (60) comprising a main filter wall (63) having a substantially tubular shape, and
   a component (5) comprising engaging means (57, 58) to a support plate (61) of the filter cartridge (60'),
   the component (5) comprising a plate (50) provided with at least a through-opening (54) in a thickness of the plate (50) and a perimeter edge to which a seal (51) is fixed, which seal (51) is destined to be interposed between a beaker-shaped body (21) and a cover (22) of a casing (20) of the filter group, the component (5) further comprising:
   a central hole,
   at least a flat filter wall (55) fixed to the plate (50) such as to intercept the at least an opening (54); and,
   a hollow shank (53) suitable for accommodating an upper end of a pipe (56) for removal of the water accumulated on the bottom of the beaker body (21).

2. The filter group of claim 1, wherein the flat filter wall (55) is a hydrophobic wall.

3. The filter group of claim 1, wherein the flat filter wall (55) lies on a plane that is substantially perpendicular to the axis (A) of the main filter wall (63) and overlies the main filter wall (63).

4. The filter group of claim 1, wherein the flat filter wall (55) exhibits a greater porosity with respect to the main filter wall (63).

5. The group of claim 1, wherein the plate (50) of the component (5) is realised in a single piece with the support plate (61) of the filter cartridge (60).

6. The filter group of claim 1, characterised in that it comprises a by-pass conduit (66) destined to set an internal volume of the main filter wall (63) in communication with outside the main filter wall (63), which by-pass conduit (66) is intercepted by a valve (70).

7. The filter group of claim 6, wherein the conduit (66) and the valve (70) are associated to the filter cartridge (60).

8. A filter (10), characterised in that it comprises a casing (20) containing a filter group (5, 60) according to claim 1.

* * * * *